(12) United States Patent
Danielsson et al.

(10) Patent No.: US 10,635,948 B2
(45) Date of Patent: Apr. 28, 2020

(54) METHOD FOR LOCATING ONE OR MORE CANDIDATE DIGITAL IMAGES BEING LIKELY CANDIDATES FOR DEPICTING AN OBJECT

(71) Applicant: Axis AB, Lund (SE)

(72) Inventors: Niclas Danielsson, Lund (SE); Simon Molin, Lund (SE); Markus Skans, Lund (SE); Jakob Grundström, Lund (SE)

(73) Assignee: Axis AB, Lund (SE)

( * ) Notice: Subject to any disclaimer, the term of this patent is extended or adjusted under 35 U.S.C. 154(b) by 112 days.

(21) Appl. No.: 16/123,773

(22) Filed: Sep. 6, 2018

(65) Prior Publication Data
US 2019/0087687 A1 Mar. 21, 2019

(30) Foreign Application Priority Data
Sep. 15, 2017 (EP) .................................. 17191310

(51) Int. Cl.
*G06K 9/62* (2006.01)
*G06F 16/55* (2019.01)
*G06F 16/75* (2019.01)
*G06F 16/56* (2019.01)

(52) U.S. Cl.
CPC ........... *G06K 9/6281* (2013.01); *G06F 16/55* (2019.01); *G06F 16/56* (2019.01); *G06F 16/75* (2019.01)

(58) Field of Classification Search
None
See application file for complete search history.

(56) References Cited

U.S. PATENT DOCUMENTS

| | | | |
|---|---|---|---|
| 5,263,097 A * | 11/1993 | Katz | G01S 3/7865 382/190 |
| 2014/0180989 A1 | 1/2014 | Krizhevsky et al. | |
| 2016/0140438 A1 | 5/2016 | Yang et al. | |
| 2016/0358024 A1 | 12/2016 | Krishnakumar et al. | |

(Continued)

OTHER PUBLICATIONS

"Multi-task CNN Model for Attribute Prediction"; Abdulnabi et al.; arXiv:1601.00400v1(Jan. 4, 2016) pp. 1-11.

(Continued)

*Primary Examiner* — Justin P. Misleh
(74) *Attorney, Agent, or Firm* — Volpe and Koenig, P.C.

(57) ABSTRACT

A method for finding one or more candidate digital images being likely candidates for depicting a specific object comprising: receiving an object digital image depicting the specific object; determining, using a classification subnet of a convolutional neural network, a class for the specific object depicted in the object digital image; selecting, based on the determined class for the specific object depicted in the object digital image, a feature vector generating subnet from a plurality of feature vector generating subnets; determining, by the selected feature vector generating subnet, a feature vector of the specific object depicted in the object digital image; locating one or more candidate digital images being likely candidates for depicting the specific object depicted in the object digital image by comparing the determined feature vector and feature vectors registered in a database, wherein each registered feature vector is associated with a digital image.

13 Claims, 4 Drawing Sheets

(56) References Cited

U.S. PATENT DOCUMENTS

2017/0169315 A1     1/2017   Vaca Castano et al.
2017/0372169 A1*   12/2017   Li ........................ G06F 16/5838

OTHER PUBLICATIONS

"OverFeat: Integrated Recognition, Localization and Detection using Convolutional Networks"; Sermanet et al.; arXiv:1312.6229v4 (Dec. 21, 2013) pp. 1-16.
"Simultaneous Classification of Several Features of a Person's Appearance Using a Deep Convolutional Neural Network"; Kukharenko et al.; ISSN 1054-6618; Pattern Recognition and Image Analysis; Jul. 2015, vol. 25, Issue No. 3; pp. 461-465.
EP 17191310.6 European Search Report ( dated Mar. 2, 2018).

* cited by examiner

METHOD FOR LOCATING ONE OR MORE CANDIDATE DIGITAL IMAGES BEING LIKELY CANDIDATES FOR DEPICTING AN OBJECT

FIELD OF INVENTION

The present teachings relate to a method for locating one or more candidate digital images being likely candidates for depicting a specific object.

BACKGROUND

In several applications there is a need for identifying digital images depicting a specific object as depicted in a specific digital image. If the specific object depicted on the reference image is a car having a registration number plate, this may be relatively straightforward to achieve, for example, using OCR techniques, whereas achieving the same for human beings or cats and the like is far more challenging, historically having left such operations to be performed manually.

One particular area where such methods are of interest is for camera surveillance systems. If a digital image shows a person, the method may be used to locate one or more images showing an object likely to be that person. For a camera surveillance system, such a method may for example be applicable for finding out if the presence of a specific object has been detected before. For example, if a crime is committed and an alleged criminal is depicted in a digital image, an operator of the camera surveillance system may click on the object showing the alleged criminal when viewing a stored video stream. A query may then be submitted such as to locate a set of candidate digital images showing what is likely to depict the alleged criminal. Additionally, metadata pertaining to the candidate digital images may be presented. Such metadata may be for example the time, date and place at which a candidate digital image was taken. From this data, it may be possible to find out if the alleged criminal was found investigating the area of the crime in advance and/or was previously seen at another area covered by the camera surveillance system.

One way of achieving such a method is to make use of deep learning algorithms using convolutional neural networks (CNNs) to teach a computer algorithm how to determine an object identity. However, such state-of-the-art methods are often very computationally intensive and are therefore often limited to a particular class of objects (such as persons, cars, cats, trees and the like) for which the CNN was pre-trained. Often it is of interest to be able to locate objects within different classes using the same digital images. Thus, there is a need in the art for an improved method which provides a faster and more accurate identification and in particular is configured for achieving identification within multiple classes of objects.

SUMMARY

A method for finding one or more candidate digital images being likely candidates for depicting a specific object is presented. The method for finding one or more candidate digital images being likely candidates for depicting a specific object comprises: receiving an object digital image depicting the specific object; determining, using a classification subnet of a convolutional neural network, a class for the specific object depicted in the object digital image; selecting, based on the determined class for the specific object depicted in the object digital image, a feature vector generating subnet from a plurality of feature vector generating subnets of the convolutional neural network; determining, by the selected feature vector generating subnet, a feature vector of the specific object depicted in the object digital image; and locating one or more candidate digital images being likely candidates for depicting the specific object depicted in the object digital image by comparing the determined feature vector of the specific object depicted in the object digital image and feature vectors registered in a database comprising registered feature vectors of objects, wherein each registered feature vector is associated with a digital image.

The method may be useful for re-identification of objects captured for example by surveillance cameras. The method may, however, be useful also for other applications, such as for example image recognition and classification in large databases such as for example internet based databases. The method may also be useful for applications related to image search on the internet, for example for suggesting related or similar images to a particular image. The object digital image may be for example a picture of a person, a car, a dog or the like. The object digital image may comprise more than one object. Thus, the method may be used to locate candidate digital images for more than one object.

The method may be advantageous as it provides a way to efficiently handle this type of identification simultaneously for a large set of different classes (e.g., persons, vehicles, cats, bags, fruits, and the like), with an efficient re-usage of previously made calculations. It could thus be easily implemented on systems such as camera surveillance systems, where limited computation capabilities are available. If the method is allowed to run on-camera, it may have access to the original uncompressed video stream. Being able to identify people and where previously seen identities re-appear can be very important information to Region Of Interest based (ROI-based) compression algorithms such as Zipstream, which is a proprietary compression algorithm of Axis Communications AB, so that these regions can be minimally compressed while still allowing for a high compression rate for other, more uninteresting image areas.

The method includes processing digital images using a convolutional neural network. Thus, it is to be understood that the method may further comprise processing the object digital image through convolutional layers in a base neural network of the convolutional neural network, thereby populating activation maps pertaining to the object depicted in the object digital image, wherein the classification subnet is connected to activation maps in the base neural network. The classification maps may comprise information pertaining to color and geometrical shape within the object digital image. This may be advantageous as it may allow for an improved more efficient identification of objects in digital images. In particular, the method may allow for speeding up the identification process for a search among objects belonging to predefined classes. Such classes may be for example people, cars, cats, houses and the like.

The base neural network of the convolutional neural network may be trained for identifying specific geometrical forms. The base neural network may, however, be trained to recognize universal shapes applicable to many different kinds of objects. This implies that the base neural network may be independent on object class. Thus, the base layer may be applicable for all kinds of objects depicted on the digital images.

For classification of the objects, the classification subnet may instead be applied. The classification subnet is configured to recognize a specific class from reading the activation maps output from the base neural network. In other words, once a digital image has been processed by the base neural network to infer its low level features such as edges and curves as well as its high-level features such as more complex concepts in the image, the activation map(s) output from the base neural network may be classified by the classification subnet. Activation maps may include only the high level features but may, alternatively or additionally, contain low level features. The classification subnet may comprise one or more fully connected layers connected to activation maps in the base neural network. If there are more than one fully connected layer, not all of them need to be connected to the base neural network. The classification subnet may further comprise a soft max layer connected to the one or more fully connected layers. The classification subnet may further comprise convolutional layers. The classification subnet may be trained for recognizing specific classes of objects, but does not have to identify objects on an individual basis. Thus, it may be enough for the classification subnet to determine that the object is a cat, not that it is the neighbor's cat.

Dependent on the determined class for the object depicted in the digital image, a feature vector generating subnet may be selected to determine a feature vector of the object depicted in the digital image. The selected feature vector generating subnet is one from a plurality of feature vector generating subnets of the convolutional network. One or more feature vector generating subnets, or even each feature vector generating subnets, of the plurality of feature vector generating subnets may comprise one or more fully connected layers connected to activation maps or a fully connected layer in the base neural network.

One or more feature vector generating subnets, or even each feature vector generating subnets, of the plurality of feature vector generating subnets may further comprise an embedding normalization layer arranged to map data from the activation maps onto a normalized vector structure such as to generate the determined feature vector.

The determined feature vector may be a vector including values from a normalization layer.

Once a feature vector has been determined, one or more candidate digital images being likely candidates for depicting the specific object depicted in the object digital image may be located by comparing the determined feature vector of the specific object depicted in the object digital image and feature vectors registered in a database comprising registered feature vectors of objects, wherein each registered feature vector is associated with a digital image.

The act of locating one or more candidate digital images being likely candidates for depicting the specific object depicted in the object digital image by comparing the determined feature vector of the specific object depicted in the object digital image and feature vectors registered in the database may comprise finding one or more matches between feature vectors registered in the database and the determined feature vector of the specific object depicted in the object digital image.

The act of finding one or more matches between feature vectors registered in the database and the determined feature vector of the specific object depicted in the object digital image may comprise calculating a distance between feature vectors registered in the database and the determined feature vector of the specific object depicted in the object digital image. For example, the calculated distance may be a Euclidian distance.

The comparison may include compiling and/or presenting the results in different ways. For example, a sorted similarity list may be created, wherein each feature vector in the sorted similarity list is sorted according to its corresponding calculated distance. In other words, the act of locating one or more candidate digital images being likely candidates for depicting the specific object depicted in the object digital image by comparing the determined feature vector of the specific object depicted in the object digital image and feature vectors registered in the database may further comprise creating a sorted similarity list wherein each feature vector is sorted according to its corresponding calculated distance.

Alternatively, or additionally, the match may be one or more specific feature vectors among the feature vectors having at least one from the list of: a calculated distance to the determined feature vector being smaller than the remaining calculated distances, a calculated distance to the determined feature vector being smaller than a threshold value, and a fixed number of specific feature vectors having the smallest distance to the determined feature vector among the feature vectors registered in the database.

The method may further comprise storing the determined feature vector of the specific object depicted in the object digital image in the database and associating the determined feature vector with the object digital image. This may be advantageous as it allows for easy retrieval of images during the act of comparing the feature vectors.

Hereinabove, it has been assumed that all previously determined features vectors are stored in a single database. However, the previously determined feature vectors may, alternatively, be stored in separate databases according to their object classification. Thus, all feature vectors derived from digital images deemed by the classification subnet to show a cat, will end up in a "cat database", all feature vectors derived from digital images deemed by the classification subnet to show a dog, will end up in a "dog database" and so on. By using more than one database, the number of stored feature vectors in each database will be lowered as compared to a case where all feature vectors are stored in a single common database. This may be advantageous as it may further speed up the act of comparing a specific feature vector with feature vectors of a database. Thus, new feature vectors are only compared to feature vectors of the same class. The plurality of class databases may be separate databases. This implies that the plurality of class databases may be stored on separate physical locations. Alternatively, the plurality of class databases may be the same database configured to keep posts separated according to their class, for example using metadata indexing.

The database may be divided into a plurality of class databases, wherein each class database comprises registered feature vectors of objects belonging to the class; and wherein the method further comprises: selecting, based on the determined class for the object depicted in the object digital image, a specific class database from the plurality of class databases. The method may thus further comprise storing the determined feature vector of the specific object depicted in the object digital image in the specific class database and associating the determined feature vector with the object digital image.

A further scope of applicability of the present teachings will become apparent from the detailed description given below. However, it should be understood that the detailed description and specific examples, while indicating embodiments of the present teachings, are given by way of illustration only, since various changes and modifications within the scope of the present teachings will become apparent to those skilled in the art from this detailed description.

Hence, it is to be understood that the present teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments are shown. The present teachings may, however, be embodied in many different forms and should not be construed as limited to the embodiments set forth herein; rather, these embodiments are provided for thoroughness and completeness, and fully convey the scope of the present teachings to the skilled person.

A method 100 will now be described with reference to FIG. 1 and FIG. 2. The method 100 is intended for locating one or more candidate digital images being likely candidates for depicting a specific object. The method 100 may be useful for re-identification of objects captured for example by surveillance cameras. The method may, however, be useful also for other applications, such as for example classification and image recognition in databases.

Figure 1:
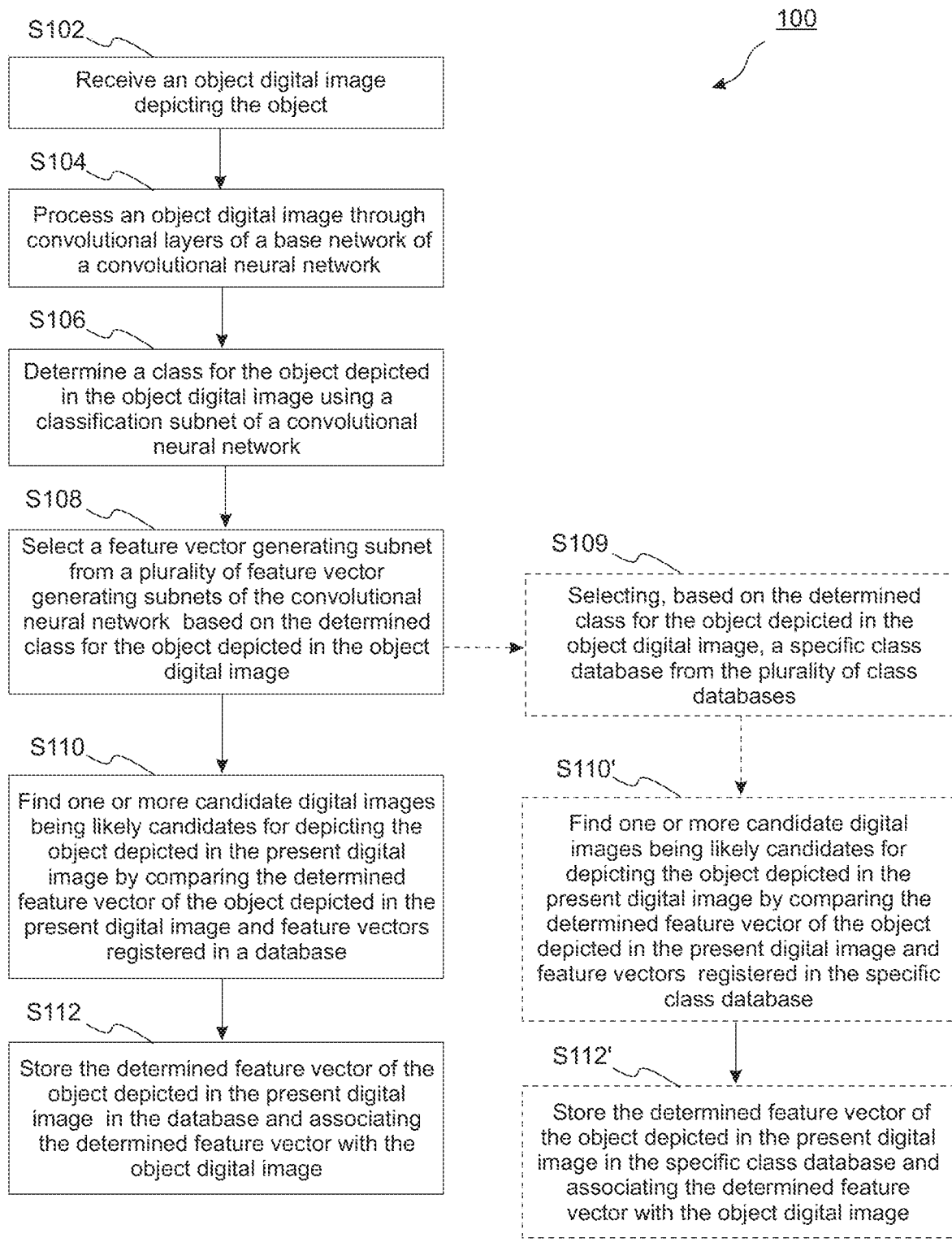
FIG. 1 is a block diagram of a method for finding one or more candidate digital images being likely candidates for depicting a specific object.
Figure 2:
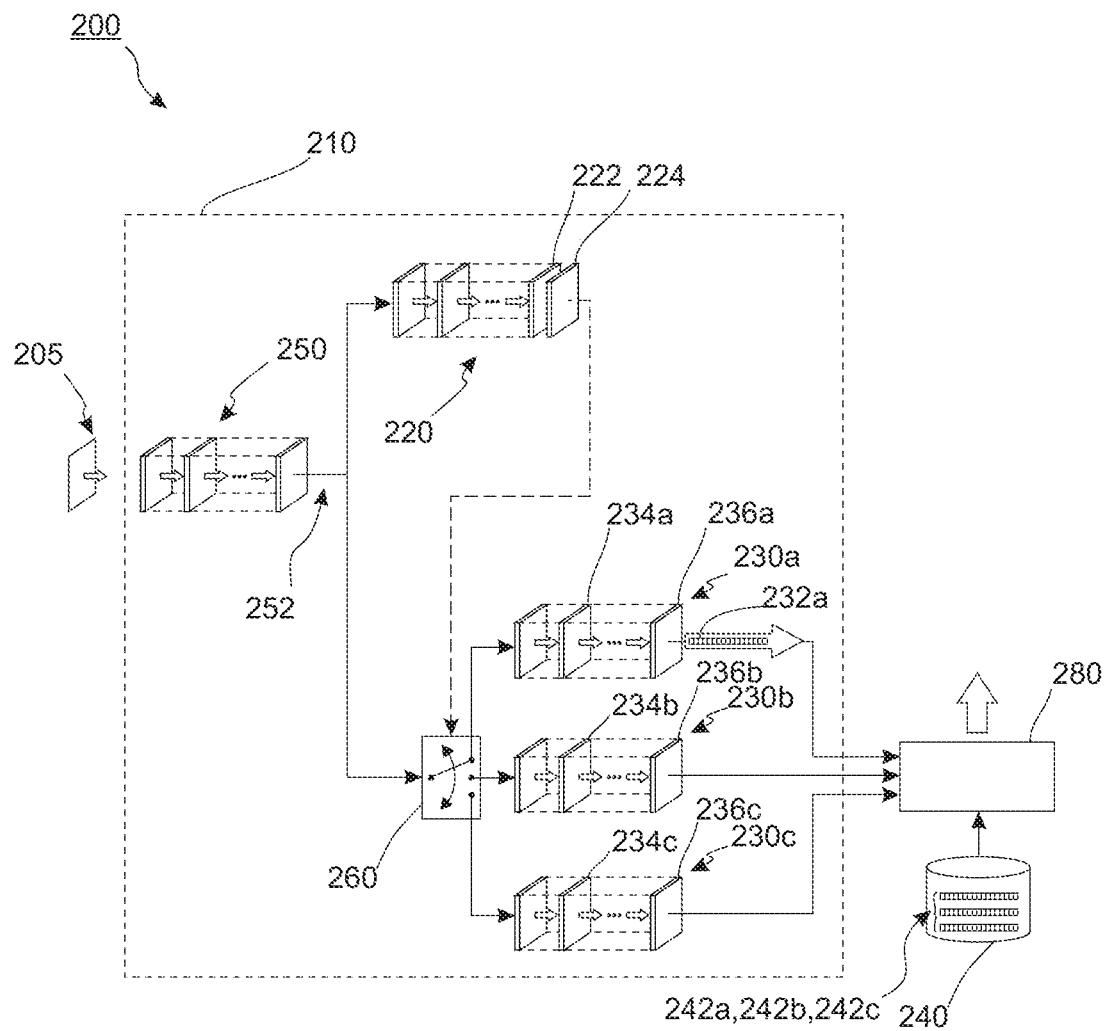
FIG. 2 is a schematic view of a system configured to perform the method for finding one or more candidate digital images being likely candidates for depicting a specific object.

FIG. 1 is a block diagram of a method for finding one or more candidate digital images being likely candidates for depicting a specific object whereas FIG. 2 shows a system 200 configured for carrying out the method 100 of FIG. 1.

The method 100 includes the act of receiving S102 an object digital image depicting a specific object. The object digital image 205 may for example be a picture of a person, a car, a dog or the like. The object digital image 205 may comprise more than one object.

The method 100 further includes the act of processing S104 the object digital image 205 through convolutional layers in a base neural network 250 of a convolutional neural network 210 (CNN). The processing results in the population of activation maps 252 pertaining to the specific object depicted in the object digital image 205. The base neural network 250 of the convolutional neural network 210 is trained for giving an input to subsequent subnets of the convolutional neural network 210. For example, the base neural network 250 of the convolutional neural network 210 may identify specific geometrical forms. Thus, the base neural network 250 may be applicable for all kinds of objects depicted on the object digital images 205. The base neural network 250 processes the object digital image 205 sequentially in layers. Thus, the base neural network 250 may comprise a plurality of layers including convolutional layers, pooling layers, rectified linear unit (ReLU) layers and the like. Training of a convolutional network such as the base neural network 250 many times results in activation layers including information relating to structures and shapes in images as will be further detailed herein. Some layers may include information relating to low level features such as edges and curves and some layers may include information relating to high-level features such as more complex concepts in the object digital image 205.

The method further includes the act of determining S106, using a classification subnet 220 of the convolutional neural network 210, a class for the specific object depicted in the object digital image 205. The classification subnet 220 is configured to recognize a specific class from reading the activation maps 252 output from the base neural network 250. In other words, once an object digital image 205 has been processed by the base neural network 250, the activation map(s) 252 output from the base neural network 250 can be classified by the classification subnet 220. Activation maps 252 may include only the high level features. However, the activation maps 252 may, alternatively or additionally, contain low level features. With high level features are meant features determined by later layers of the base neural network 250 and with low level features are meant features determined by early layers of the base neural network 250. The classification subnet 220 may comprise a fully connected layer 222 connected to the activation maps 252 in the base neural network 250. The classification subnet 220 may further comprise a soft max layer 224 connected to the one or more fully connected layers. The classification subnet 220 may further comprise convolutional layers. The classification subnet 220 may be trained for recognizing specific classes of objects, but does not have to identify objects on an individual basis. Thus, it may be enough for the classification subnet 220 to determine that the object is a cat, not that it is the neighbor's cat.

The method further includes the act of selecting S108, based on the determined class for the specific object depicted in the object digital image 205, a feature vector generating subnet from a plurality of feature vector generating subnets 230a, 230b, 230c of the convolutional neural network 210. The selecting is illustrated in FIG. 2 by a selecting module 260. In the example embodiment shown in FIG. 2, the plurality of feature vector generating subnets comprises a first feature vector generating subnet 230a, a second feature vector generating subnet 230b and a third feature vector generating subnet 230c. Each feature vector generating subnet from the plurality of feature vector generating subnets 230a, 230b, 230c comprises one or more fully connected layers 234a, 234b, 234c connected to activation maps 252 in the base neural network 250. One or more of the plurality of feature vector generating subnets 230a, 230b, 230c may further comprise convolutional layers. Furthermore, one or more of the plurality of feature vector generating subnets 230a, 230b, 230c may further comprise an embedding normalization layer 236a, 236b, 236c arranged to map data from the activation maps 252 onto a normalized vector structure such as to generate the determined feature vector. The determined feature vector (In the example: the first feature vector 230a) may be a vector including values from a normalization layer. The selecting is illustrated in FIG. 2 by means of the selecting module 260 which is controlled by the classification subnet 220. An implementation of the method 100 may achieve the selecting functionality by means of a software code run on a processing unit. Alternatively, the selecting module 260 may be implemented using a dedicated circuitry. Yet alternatively, the selecting module 260 may comprise both dedicated circuitry and software code run on a processing unit.

The method 100 further includes the act of locating S110 one or more candidate digital images being likely candidates for depicting the specific object depicted in the object digital image 205 by comparing the determined feature vector 232a of the specific object depicted in the object digital image 205 and feature vectors 242 registered in a database 240 comprising registered feature vectors 242 of objects, wherein each registered feature vector 242 is associated with a digital image.

Figure 3:
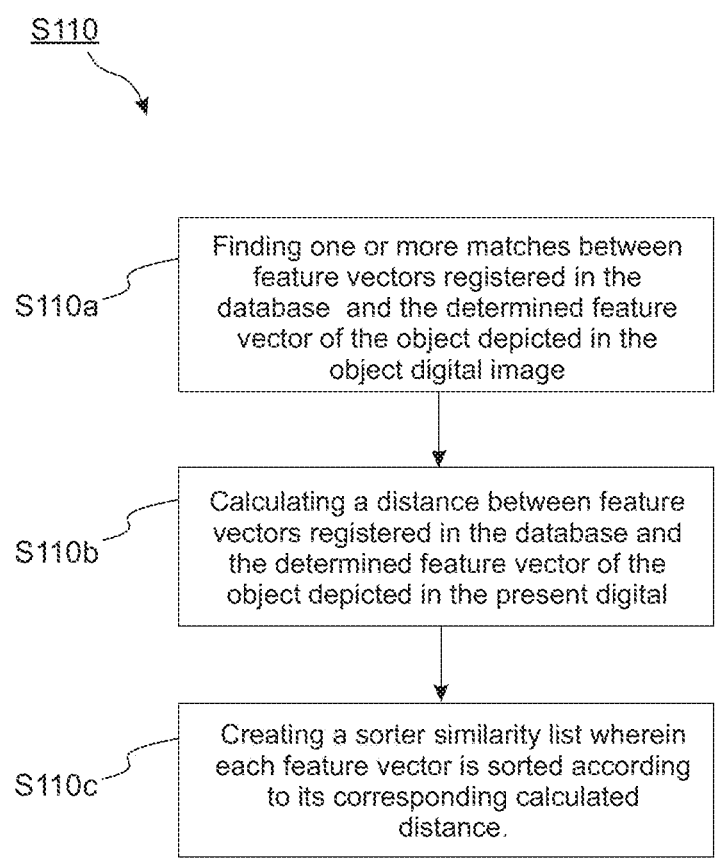
FIG. 3 is a block diagram of the act of finding S110 in the method of FIG. 1.

The act of locating S110 one or more candidate images is further discussed with references to FIG. 3. The act of locating S110 may include the act of finding S110a one or more matches between feature vectors 242 registered in the database 240 and the determined feature vector 232a of the specific object depicted in the object digital image 205. The act of locating S110 may further include calculating S110b a distance between feature vectors 142a registered in the database 140 and the determined feature vector 132a of the specific object depicted in the object digital image 205. The calculated distance may be a Euclidian distance. However, as readily known by the person skilled in the art, the distance between the two vectors may be calculated in other known manners as well. The act of locating S110 may further include the act of creating S110c a sorted similarity list wherein each feature vector is sorted according to its corresponding calculated distance.

The match can be a specific feature vector among the feature vectors 242a having a calculated distance to the determined feature vector 232a being smaller than the remaining calculated distances. The match can be one or more specific feature vector among the feature vectors 242a having a calculated distance to the determined feature vector 232a being smaller than a threshold value. The match can be a fixed number of candidate images. The fixed number of candidate images may be chosen such they are the candidate images associated with feature vectors having the smallest distance to the determined feature vector.

After finding the matches between feature vectors 242 registered in the database 240 and the determined feature vector 232a of the specific object depicted in the object digital image 205 the candidate images may be presented to an operator of the system. From the candidate images one or more specific images may be manually selected. The candidate images may be presented to the operator according to the sorted similarity list.

The method 100 may further comprise the alternative act of storing S112 the determined feature vector 232a of the specific object depicted in the object digital image 205 in the database 240a and associating the determined feature vector 232a with the object digital image 205.

Figure 4:
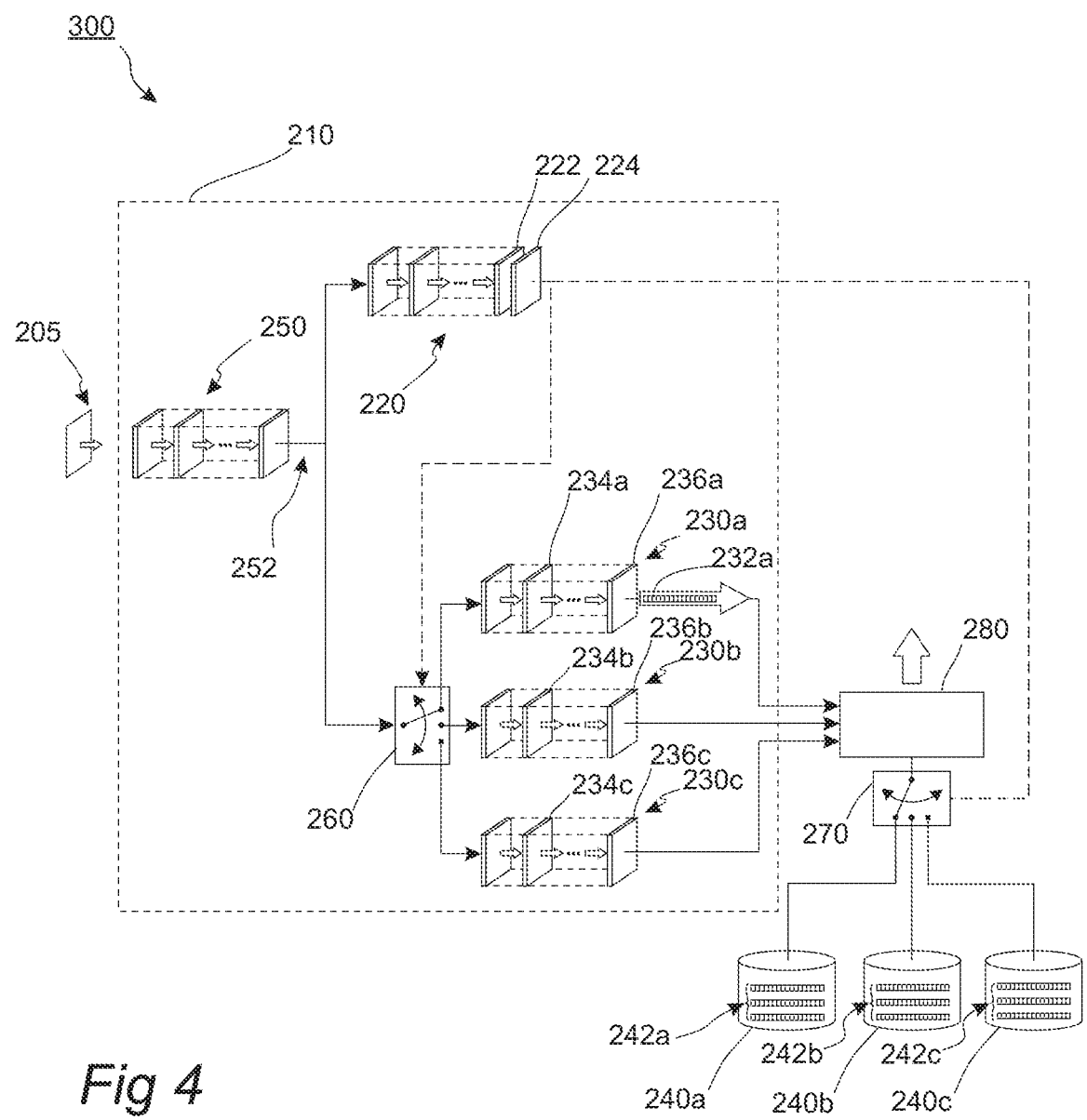
FIG. 4 shows is a schematic view of an alternative system configured to perform the method for finding one or more candidate digital images being likely candidates for depicting a specific object.

The method 100 may be adapted to operate using more than one database. This is illustrated in the right hand alternative branch of the flow chart in FIG. 1. To further illustrate the method used in this way, a system 300 is shown in FIG. 4. The system 300 is similar to the system 200 but the database is divided into a plurality of class databases 240a, 240b, 204c, wherein each class database comprises registered feature vectors 242a, 242b, 242c of objects belonging to each class. The method 100 may hence further comprise selecting S109, based on the determined class for the specific object depicted in the object digital image 205, a specific class database (in the example: the first class database 240a) from the plurality of class databases 240a, 240b, 240c. The act of locating S110' is similar to what has been disclosed hereinabove for the act of locating S210, but instead of comparing to feature vectors stored in a single database, comparison is done only among feature vectors of the selected class database. The selecting is illustrated in FIG. 4 by means of a further selecting module 270 which is controlled by the classification subnet 220. An implementation of the selecting module 260 may be implemented by means of a software code run on a processing unit. Alternatively, the selecting module 260 may be implemented using a dedicated circuitry. Yet alternatively, the selecting module 260 may comprise both dedicated circuitry and software code run on a processing unit The method 100 may further comprise the alternative act of storing S112' the determined feature vector 232a of the specific object depicted in the object digital image 205 in the specific class database 240a and associating the determined feature vector 232a with the object digital image 205.

In order for the convolutional network to operate properly, it must be trained using known input. The training of the convolutional neural network may be set up as follows. For example, sets of three images are input to the convolutional network. Two of the images may be depicting the same object and the third depicting another object but of the same class. A loss value is determined for all of the subnets (i.e., for the classification subnet 220 and the feature vector generating subnets 230a, 230b, 230c). The loss value pertains to the ability of each subnet to predict the correct answer. A loss function is constructed which is subject to minimization both of a classification error and intra class re-identification errors simultaneously (e.g., by addition of these errors in the loss function). Thus, both the resulting classification and the resulting feature vector will be evaluated and the parameters of the convolutional network will be adjusted in accordance with both of the results.

The person skilled in the art realizes that the present teaches are by no means is limited to the embodiments described above. On the contrary, many modifications and variations are possible within the scope of the appended claims.

For example, when training the present convolutional network, one might use a Siamese setup with two network passes instead of three, and try to minimize the distance between pairs of images if they depict the same object and maximize the distance between pairs of images depicting different objects. One could also have different training schemes such as alternately train the base neural network with the classification subnet, and then train the base neural network with the re-identification subnet and repeat many times with a switching scheme between the two.

Additionally, variations to the disclosed embodiments can be understood and effected by the skilled person in practicing the present teachings, from a study of the drawings, the disclosure, and the appended claims.

What is claimed is:

1. A method for finding one or more candidate digital images being likely candidates for depicting a specific object, the method comprising:
   receiving an object digital image depicting the specific object;
   processing the object digital image through convolutional layers in a base neural network of a convolutional neural network to populate activation maps pertaining to the specific object depicted in the object digital image;
   determining, using a classification subnet of the convolutional neural network, a class, among a plurality of predetermined classes, for the specific object depicted in the object digital image, wherein the classification subnet is connected to activation maps in the base neural network;
   selecting, based on the determined class for the specific object depicted in the object digital image, a feature vector generating subnet from a plurality of feature vector generating subnets of the convolutional neural network, wherein each of the plurality of feature vector generating subnets is linked to at least one of the plurality of predetermined classes;
   determining, by the selected feature vector generating subnet, a feature vector of the specific object depicted in the object digital image; and
   finding one or more candidate digital images being likely candidates for depicting the specific object depicted in the object digital image by finding one or more matches between the determined feature vector of the specific object depicted in the object digital image and feature vectors registered in a database comprising registered feature vectors of objects, wherein each registered feature vector is associated with a digital image.

2. The method according to claim 1, wherein the classification subnet comprises one or more fully connected layers connected to the activation maps.

3. The method according to claim 2, wherein the classification subnet further comprises a soft max layer connected to the one or more fully connected layers.

4. The method according to claim 1, wherein one or more of the plurality of feature vector generating subnets comprises one or more fully connected layers connected to the activation maps.

5. The method according to claim 4, wherein one or more of the plurality of feature vector generating subnets further comprises an embedding normalization layer arranged to map data from the activation maps onto a normalized vector structure to generate the determined feature vector.

6. The method according to claim 5, wherein the determined feature vector is a vector including values from the embedding normalization layer.

7. The method according to claim 1, wherein the act of finding one or more matches between the determined feature vector of the specific object depicted in the object digital image and the feature vectors registered in the database comprises:
   calculating a distance between feature vectors registered in the database and the determined feature vector of the specific object depicted in the object digital image.

8. The method according to claim 7, wherein the calculated distance is a Euclidian distance.

9. The method according to claim 1, wherein the finding one or more candidate digital images being likely candidates for depicting the specific object depicted in the object digital image by comparing the determined feature vector of the specific object depicted in the object digital image and feature vectors registered in the database further comprises:
   creating a sorted similarity list, wherein each feature vector is sorted according to its corresponding calculated distance.

10. The method according to claim 1, wherein the one or more specific feature vectors among the feature vectors that are matched with the determined feature vector of the specific object depicted in the object digital images have at least one characteristic from the list of
   a calculated distance to the determined feature vector being smaller than the remaining calculated distances,
   a calculated distance to the determined feature vector being smaller than a threshold value, and
   a fixed number of specific feature vectors having the smallest distance to the determined feature vector among the feature vectors registered in the database.

11. The method according to claim 1, further comprising storing the determined feature vector of the specific object depicted in the object digital image in the database and associating the determined feature vector with the object digital image.

12. The method according to claim 1,
   wherein the database is divided into a plurality of class databases, wherein each class database comprises registered feature vectors of objects belonging to the class; and
   wherein the method further comprises: selecting, based on the determined class for the specific object depicted in the object digital image, a specific class database from the plurality of class databases.

13. The method according to claim 12, further comprising storing the determined feature vector of the specific object depicted in the object digital image in the specific class database and associating the determined feature vector with the object digital image.

* * * * *